Patented Apr. 28, 1931

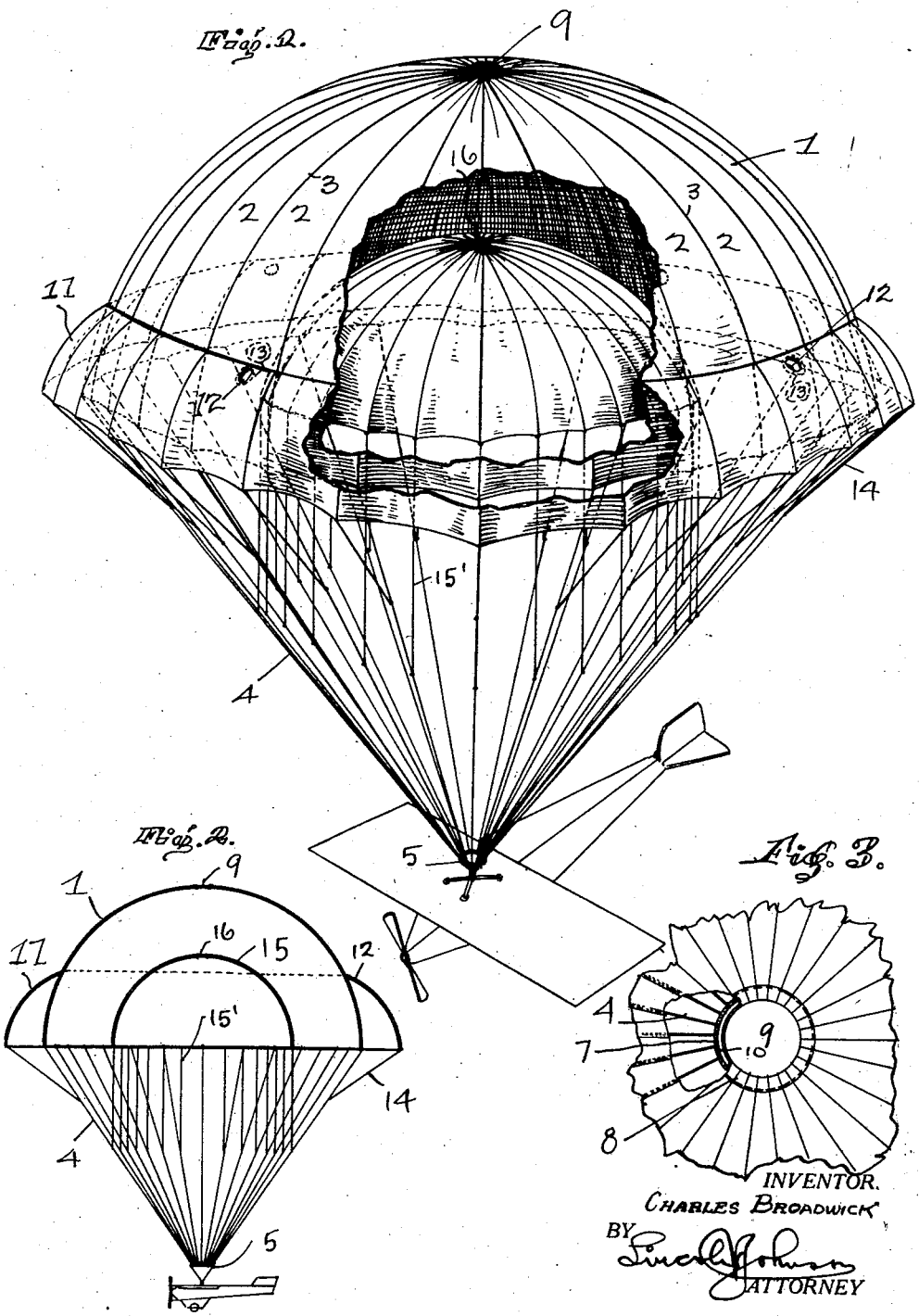

1,802,325

UNITED STATES PATENT OFFICE

CHARLES BROADWICK, OF SAN FRANCISCO, CALIFORNIA

PARACHUTE

Application filed November 5, 1928. Serial No. 317,142.

This invention relates to parachutes for transporting humans, airplanes and other objects through the air at a slow rate of speed to the ground.

An object of the invention is to provide a parachute which may or may not be provided with a vent in the head thereof, which is adapted to open and contract in accordance with the varying air pressures below the parachute, and which also is provided with a skirt around the outside of the edge of the parachute, and which also may or may not be provided with vents therein adapted to open and contract in accordance with the varying air pressures below the parachute, whereby the vents in both the parachute and skirt will open when encountering a sudden impact or pressure of the air below the parachute, to resiliently absorb the same and after the pressure has been relieved, the vents will contract, thereby avoiding tearing of the material out of which the parachute and skirt are formed.

A further object of the invention is to provide a parachute with a skirt around the circumference of the outside thereof capable of assisting in the support of any load carried by the parachute, whereby a parachute of a relatively small size provided with a skirt thereon, will safely carry to the ground at a slower speed and without swinging or oscillating movement, a greater load than that which might be carried by a parachute of the same size not equipped with a skirt.

A still further object of the invention is to provide a parachute having a skirt around the outside of the free edge thereof and a secondary parachute of smaller diameter than the outer parachute, confined within the center thereof, the outer parachute having supporting lines attached thereto to which are secured supporting lines extended from the edge of the skirt and the edge of the inner parachute.

Other objects of the invention are to provide a load carrying parachute that will be superior in point of simplicity, inexpensiveness of construction, positiveness of operation, and facility and convenience in use and general efficiency.

In this specification and the annexed drawings, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

In the accompanying one sheet of drawings:

Fig. 1 represents a perspective view of a parachute having a skirt thereon, and an inner parachute therein constructed in accordance with my invention.

Fig. 2 is a reduced size cross section taken through the parachute structure shown in Fig. 1.

Fig. 3 is a plan view of a portion of the parachute around the vent.

In detail the construction illustrated in the drawings comprises a concavo-convex sheet 1, preferably formed of silk, and made of a series of tapered segments or panels 2, united together along their meeting edges in seams 3. The edges of the segments are united in seams 3 and these seams are formed so as to loosely include the supporting lines 4 which extend from the carriage structure 5 upwardly to the lower edge of the parachute where they are attached to the material of the sheet, thence through the seams to the head of the parachute where they are formed in a loop 7 which lies in the hemmed edge 8 forming a vent 9 through the head or center of the parachute. The vent 9 consists of a circular hole through the center or head of the parachute held in a contracted position by a rubber cord 10 enclosed in the hem 8, which allows the vent to open and contract in accordance with the varying air pressures below the parachute. The size of the vent when contracted and when expanded, will vary with the size of the parachute.

When the parachute is in flight, the force of the air below the parachute, or whatever air pressure the parachute encounters as it drops, causes the vent in the head of the parachute to automatically open and contract, to relieve excessive air pressures to prevent damage or tearing of the parachute, and to allow the parachute to drop at a uniform rate of speed. The vent also causes the parachute to drop in a relatively straight path and eliminates any oscillating or swinging movement of the parachute.

I have provided a silk skirt 11 sewed continuously about the outside of the sheet 1 near the free edge thereof, said skirt being formed of segments or panels of the same material out of which the parachute is formed and sewed to the parachute so that the seams of the skirt are in substantial alignment with the seams of the parachute. The skirt is sewed to the parachute a substantial distance above the free edge of the sheet 1, whereby when the parachute is in flight, the skirt will fill with air and belly outward to offer additional resisting surface to the air and consequently to increase the carrying capacity of the parachute. The skirt 11 is provided with a plurality of vents 12 formed therethrough at spaced intervals around the entire circumference thereof, each vent being formed by a circular seam sewed through the skirt with an expansible elastic band 13 confined in the seam around the vent, to expand or contract automatically according to the pressure of the air below the parachute. The vents of the skirt permit the air force below the skirt to be dissipated therethrough and to prevent the said skirt from becoming torn or otherwise damaged in the event an air pressure is accumulated between the skirt and parachute and not dissipated therefrom. The edge of the skirt is provided with supporting lines 14 thereon which are connected to the supporting lines 4 of the parachute.

A parachute 15, of a smaller diameter and depth than the outer parachute and shaped as a concavo-convex sheet, out of a series of segment panels sewed together along the meeting edges thereof, is confined within the outer parachute in spaced relation thereto, the inner parachute having supporting lines 15' secured to the edge thereof that are in turn connected to the supporting lines 4 of the outer parachute. The inner parachute 15 is provided with an expansion head or vent 16 in the center thereof, which is adapted to open and contract in accordance with the varying air pressures below the parachute as it drops. The expansible vents in the head of the inner parachute and in the outer parachute and around the skirt, open and close in the same manner to relieve varying air pressures below the parachute.

Having thus described this invention, what I claim and desire to secure by Letters Patent is:

1. A parachute comprising a concavo-convex sheet; carrying lines attached to the lower edge of said sheet; a skirt around the outside of the lower edge of the parachute and secured to the sheet at a point above the edge thereof; carrying lines attached to the edge of the skirt and to the first mentioned lines; a concavo-convex sheet of smaller diameter than and within the inside of the first mentioned sheet; and carrying lines on the edge of said last mentioned concavo-convex sheet attached to the first mentioned carrying lines.

2. A parachute comprising a concavo-convex sheet formed with a vent which is adapted to open and contract in accordance with the varying air pressures below the parachute; carrying lines attached to the lower edge of said sheet; a skirt around the outside of the lower edge of the parachute and secured to the sheet at a point above the edge thereof; carrying lines attached to the edge of the skirt and to the first mentioned carrying lines; a concavo-convex sheet of smaller diameter than the first mentioned concavo-convex sheet, formed with a vent the size of which varies according to the air pressure below the parachute; and carrying lines attached to the edge of said last mentioned sheet and to the first mentioned carrying lines.

3. A parachute comprising a concavo-convex sheet formed with a vent therein which is adapted to open and contract in accordance with the varying air pressures below the parachute; a skirt around the outside of the first mentioned sheet formed with a plurality of vents therein which are adapted to open and contract in accordance with the varying air pressures below the parachute; supporting lines attached to the edges of the parachute and the skirt thereon, at spaced points throughout the circumference thereof; and a concavo-convex sheet of smaller diameter than the first mentioned concavo-convex sheet formed with a vent therein which is adapted to open and contract in accordance with the varying air pressures below the parachute, said last mentioned concavo-convex sheet being positioned within the first mentioned concavo-convex sheet and having supporting lines thereon attached to the first mentioned supporting lines.

4. A parachute comprising a concavo-convex sheet, a second concavo-convex sheet of smaller diameter than and being positioned within the first mentioned concavo-convex sheet, supporting lines attached to the edges of the first concavo-convex sheet; and means to attach the second sheet of the said supporting lines with freedom of lateral movement relatively to the first sheet, the edges of the first and second sheets being substantially in the same plane when the sheets are inflated.

5. A parachute comprising a concavo-convex sheet, a second concavo-convex sheet of smaller diameter than and being positioned within the first mentioned concavo-convex sheet, supporting lines attached to the edges of the first concavo-convex sheet; means to attach the second sheet to the said supporting lines with freedom of lateral movement relatively to the first sheet, a skirt around the outside of the first mentioned sheet secured thereto at points above the edge of the first sheet; and supporting lines attached to the edges of the skirt and to the first mentioned supporting lines to hold the edge of the skirt, when inflated, substantially in the plane of the edges of the first mentioned sheet.

6. A parachute comprising a concavo-convex sheet, a second concavo-convex sheet of smaller diameter than and being positioned within the first mentioned concavo-convex sheet, supporting lines attached to the edges of the first concavo-convex sheet; and means to attach the second sheet to the said supporting lines with freedom of lateral movement relatively to the first sheet, the edges of the first and second sheets being substantially in the same plane when the sheets are inflated, each of said sheets having a vent in the apex thereof, which is adapted to automatically open and contract in accordance with the varying air pressures below the respective concavo-convex sheets.

7. A parachute comprising a concavo-convex sheet, a second concavo-convex sheet of smaller diameter than and being positioned within the first mentioned concavo-convex sheet, supporting lines attached to the edges of the first concavo-convex sheet; means to attach the second sheet to the said supporting lines with freedom of lateral movement relatively to the first sheet, a skirt around the outside of the first mentioned sheet secured thereto at points above the edge of the first sheet; and supporting lines attached to the edges of the skirt and to the first mentioned supporting lines to hold the edge of the skirt, when inflated, substantially in the plane of the edges of the first mentioned sheet, each of said sheets having a vent in the apex thereof, which is adapted to automatically open and contract in accordance with the varying air pressures below the respective concavo-convex sheets.

8. A parachute comprising a concavo-convex sheet, a second concavo-convex sheet of smaller diameter than and being positioned within the first mentioned concavo-convex sheet, supporting lines attached to the edges of the first concavo-convex sheet; means to attach the second sheet to the said supporting lines with freedom of lateral movement relatively to the first sheet, a skirt around the outside of the first mentioned sheet secured thereto at points above the edge of the first sheet; and supporting lines attached to the edges of the skirt and to the first mentioned supporting lines to hold the edge of the skirt, when inflated, substantially in the plane of the edges of the first mentioned sheet, each of said sheets having a vent in the apex thereof, which is adapted to automatically open and contract in accordance with the varying air pressures below the respective concavo-convex sheets, said skirt having a plurality of vents therein, which are adapted to open and contract in accordance with the varying air pressures below the parachute.

9. A parachute comprising a concavo-convex sheet, a second concavo-convex sheet of smaller diameter than and being positioned within the first mentioned concavo-convex sheet, supporting lines attached to the edges of the first concavo-convex sheet; and supporting lines attached to the edge of the second sheet and to the respective first mentioned supporting lines, at points intermediate the ends of said first mentioned supporting lines.

10. A parachute comprising a concavo-convex sheet, a second concavo-convex sheet of smaller diameter than and being positioned within the first mentioned concavo-convex sheet, supporting lines attached to the edges of the first concavo-convex sheet; and supporting lines attached to the edge of the second sheet and to the respective first mentioned supporting lines, at points intermediate the ends of said first mentioned supporting lines, the edges of the first and second sheets being substantially in the same plane when the sheets are inflated.

11. A parachute comprising a concavo-convex sheet, a second concavo-convex sheet of smaller diameter than and being positioned within the first mentioned concavo-convex sheet, supporting lines attached to the edges of the first concavo-convex sheet; supporting lines attached to the edge of the second sheet and to the respective first mentioned supporting lines, at points intermediate the ends of said first mentioned supporting lines, the edges of the first and second sheets being substantially in the same plane when the sheets are inflated, a skirt around the outside of the first mentioned sheet secured thereto at points above the edge of the first sheet; and supporting lines attached to the edge of the skirt and to the first mentioned supporting lines to hold the edge of the skirt, when inflated, substantially in the plane of the edges of the first mentioned sheet.

12. A parachute comprising a concavo-convex sheet, a second concavo-convex sheet of smaller diameter than and being positioned within the first mentioned concavo-convex sheet, supporting lines attached to the edges of the first concavo-convex sheet; supporting lines attached to the edge of the second sheet and to the respective first mentioned supporting lines, at points intermediate the ends of said first mentioned supporting lines, the edges of the first and second sheets being substantially in the same plane when the sheets are inflated; a skirt around the outside of the first mentioned sheet secured thereto at points above the edge of the first sheet; and supporting lines attached to the edge of the skirt and to the first mentioned supporting lines to hold the edge of the skirt, when inflated, substantially in the plane of the edges of the first mentioned sheet, each of said sheets having a vent in the apex thereof, which is adapted to automatically open and contract in accordance with the varying air pressures below the respective concavo-convex sheets.

13. A parachute comprising a concavo-convex sheet, a second concavo-convex sheet of smaller diameter than and being positioned within the first mentioned concavo-convex sheet, supporting lines attached to the edges of the first concavo-convex sheet; supporting lines attached to the edge of the second sheet and to the respective first mentioned supporting lines, at points intermediate the ends of said first mentioned supporting lines, the edges of the first and second sheets being substantially in the same plane when the sheets are inflated; a skirt around the outside of the first mentioned sheet secured thereto at points above the edge of the first sheet; and supporting lines attached to the edge of the skirt and to the first mentioned supporting lines to hold the edge of the skirt, when inflated, substantially in the plane of the edges of the first mentioned sheet, each of said sheets having a vent in the apex thereof, which is adapted to automatically open and contract in accordance with the varying air pressures below the respective concavo-convex sheets, said skirt having a plurality of vents therein, which are adapted to open and contract in accordance with the varying air pressures below the parachute.

In testimony whereof, I have hereunto set my hand at San Francisco, California, this 11th day of October, 1928.

CHARLES BROADWICK.